US011433555B2

(12) United States Patent
Smith et al.

(10) Patent No.: US 11,433,555 B2
(45) Date of Patent: Sep. 6, 2022

(54) ROBOTIC GRIPPER WITH INTEGRATED TACTILE SENSOR ARRAYS

(71) Applicant: Robotik Innovations, Inc., Palo Alto, CA (US)

(72) Inventors: Clinton J. Smith, San Francisco, CA (US); Christopher A. Paulson, Redwood City, CA (US); Christopher Lalau Keraly, San Francisco, CA (US); Matthew E. Shaffer, Menlo Park, CA (US); Bernard D. Casse, Saratoga, CA (US)

(73) Assignee: RIOS Intelligent Machines, Inc., Menlo Park, CA (US)

( * ) Notice: Subject to any disclaimer, the term of this patent is extended or adjusted under 35 U.S.C. 154(b) by 308 days.

(21) Appl. No.: 16/832,800

(22) Filed: Mar. 27, 2020

(65) Prior Publication Data

US 2020/0306993 A1    Oct. 1, 2020

Related U.S. Application Data

(60) Provisional application No. 62/826,883, filed on Mar. 29, 2019, provisional application No. 62/826,834, (Continued)

(51) Int. Cl.
*B25J 15/02*    (2006.01)
*B25J 9/16*    (2006.01)
(Continued)

(52) U.S. Cl.
CPC .......... *B25J 15/024* (2013.01); *B25J 9/0009* (2013.01); *B25J 9/161* (2013.01); *B25J 9/1694* (2013.01);
(Continued)

(58) Field of Classification Search
CPC ........ B25J 15/024; B25J 9/0009; B25J 9/161; B25J 9/1694; B25J 13/084; B25J 13/086;
(Continued)

(56) References Cited

U.S. PATENT DOCUMENTS 6,826,452 B1 * 11/2004 Holland .................. B66C 23/00
318/568.22
9,238,304 B1 *  1/2016 Bradski .................. B25J 9/0093
(Continued)

*Primary Examiner* — Jaime Figueroa
(74) *Attorney, Agent, or Firm* — Bever, Hoffman & Harms, LLP

(57) ABSTRACT

A robotic gripper (end effector) for an arm-type robotic system includes a hierarchical sensor architecture that utilizes a central data processing circuit to generate rich sensory tactile data in response to pressure, temperature, vibration and/or proximity sensor data generated by finger-mounted sensor groups in response to interactions between the robotic gripper and a target object during robotic system operations. The rich sensory tactile data is used to generate feedback signals that directly control finger actuators and/or tactile information that is supplied to the robotic system's control circuit. Sensor data processing circuits are configured to receive single-sensor data signals in parallel from the sensor groups, and to transmit corresponding finger-level sensor data signal on a serial bus/signal line to the central data processing circuit. Each sensor group and an associated sensor data processing circuit are disposed on a PCB structure and mounted on a contact portion of an associated gripper finger.

20 Claims, 3 Drawing Sheets

Related U.S. Application Data filed on Mar. 29, 2019, provisional application No. 62/826,816, filed on Mar. 29, 2019.

(51) Int. Cl.
| | | |
|---|---|---|
| *B25J 15/08* | (2006.01) | |
| *B25J 9/00* | (2006.01) | |
| *B25J 19/02* | (2006.01) | |
| *B25J 13/08* | (2006.01) | |

(52) U.S. Cl.
CPC ........... *B25J 13/084* (2013.01); *B25J 13/086* (2013.01); *B25J 15/08* (2013.01); *B25J 19/028* (2013.01)

(58) Field of Classification Search
CPC ........ B25J 15/08; B25J 19/028; B25J 9/1612; G05B 2219/39528; G05B 2219/39532
USPC ................ 700/245–264; 318/568.11–568.25
See application file for complete search history.

(56) References Cited

U.S. PATENT DOCUMENTS

| | | | |
|---|---|---|---|
| 9,664,717 B2* | 5/2017 | Choi .......................... | G01L 1/04 |
| 10,682,774 B2* | 6/2020 | Bingham ............... | B25J 13/085 |
| 10,946,515 B2* | 3/2021 | Levine ................... | G06N 3/084 |
| 2010/0117978 A1* | 5/2010 | Shirado ............... | G06F 3/03547 |
| | | | 345/173 |
| 2010/0155156 A1* | 6/2010 | Finkelstein .............. | B25J 5/007 |
| | | | 901/1 |
| 2013/0238123 A1* | 9/2013 | Mihara ................ | B62D 57/032 |
| | | | 700/245 |
| 2014/0316564 A1* | 10/2014 | Nakamura ............... | B25J 5/007 |
| | | | 901/1 |
| 2014/0365010 A1* | 12/2014 | Yasuda .................. | G06V 20/64 |
| | | | 348/91 |
| 2015/0109006 A1* | 4/2015 | Choi ..................... | B25J 13/084 |
| | | | 264/105 |
| 2018/0284755 A1* | 10/2018 | Celia ....................... | H04W 4/38 |
| 2019/0176348 A1* | 6/2019 | Bingham ............... | B25J 13/086 |

\* cited by examiner

ROBOTIC GRIPPER WITH INTEGRATED TACTILE SENSOR ARRAYS

RELATED APPLICATION

This application claims priority from U.S. Provisional Patent Application No. 62/826,883, entitled "Robotic Gripper with Integrated Multi-Modal Tactile Sensor Arrays", filed on Mar. 29, 2019, from U.S. Provisional Patent Application No. 62/826,816, entitled "Multimodal, 3D Sensing Architecture For Robotic Tactile Exploration", filed on Mar. 29, 2019, and from U.S. Provisional Patent Application No. 62/826,834, entitled "Out of Plane Circuitry for Piezoelectric Tactile Sensors", filed on Mar. 29, 2019.

FIELD OF THE INVENTION

This invention relates generally to robotic systems and more particularly to gripper-type end effectors for arm-type robot mechanisms.

BACKGROUND OF THE INVENTION

Most modern robotic systems integrate mechanical, electrical/electronic and computer science technologies to provide autonomously controlled mechanisms capable of performing a variety of programmed robotic operations (tasks). For example, articulated robots are a class of industrial robotic systems in which a control circuit converts user-provided software-based instructions into motor control signals that control a robot arm mechanism and attached end effector (i.e., an end-of-arm-tooling device, such as a robotic gripper that performs functions similar to those performed by a human hand) to perform repetitive tasks, such as grasping target objects while the robot arms moves the target objects from one location to another location. To perform such programmed operations, the software-based instructions provided to most articulated robots must specify three-dimensional (3D) coordinates of the starting location at which the target objects are located for pick-up, a designated 3D travel path through which the target objects may be moved without interference, and 3D coordinates defining the terminal location (e.g., a receptacle or support surface) at which the target objects are to be placed. When suitable software-based instructions are provided for performing a specific robotic operation, the system controller generates a corresponding series of motor control signals that cause the robot arm mechanism to move the end effector to the initial/starting location coordinates, then cause the gripper to close on (grasp) the target object, then cause the robot arm mechanism to lift/move the target object to the terminal location coordinates along the designated travel path, and then cause the gripper to release the target object.

The main limitation of conventional robotic systems is their lack of human-hand-type sensory input that would allow adjustment to a wide range of common operational irregularities and/or to perform advance robotic operations. That is, unlike the sensor systems found in human hands that provide multimodal sensory feedback (i.e., mechanoreceptors sensing both pressure and vibration, and thermoreceptors sensing temperature), the robotic grippers utilized in most conventional robotic systems utilize no sensing architecture, and those that do utilize single-modality sensing architectures (e.g., pressure sensing only). The multimodal sensing architecture found on human hands provides fine-grained cues about contact forces, textures, local shape around contact points, and deformability, all of which are critical for evaluating an ongoing grasping operation, and to trigger force correction measures in case of instability. In contrast, conventional robotic systems that utilize grippers having no sensing architecture rely entirely on pre-programmed commands, whereby these systems typically fail to adjust for minor positional variations to unanticipated environmental variations. For example, even a small positional displacement of a target object away from its program-designated starting location coordinates may prevent successfully grasping by the gripper, and in some cases may result in damage to the target object and/or gripper (e.g., due to off-center contact between the gripper and the target object during the grasping operation). While grippers having single-modality sensing architectures provide some feedback information to the host robotic system's control circuit, thereby allowing the control circuit to modify user-provided program instructions in order to correct for a small number of specific operating environment irregularities (e.g., minor target object positional variations relative to expected programmed coordinates), they are incapable of addressing a wide range of operating environment irregularities and/or perform more advanced robotic operations. For example, although single-modality pressure sensors may provide sufficient data to verify that a predetermined gripping force is being applied onto a target object, such single-modality pressure sensors are unable to recognize when the target object may be slipping from the gripper's grasp, and therefore are unable to avoid the resulting accident damage to the target object if dropped.

Although it would be possible to enhance the capabilities of conventional arm-type robotic systems by way of adding additional sensors, simply adding sensors to existing gripper structures would be problematic. First, the addition of gripper-mounted sensors using conventional methods would require signal lines (one for each sensor) that would extend along the arm mechanism from each sensor to the system controller; this requirement would both limit the number of sensors that could be accommodated, and could also present weight-related issues when large numbers of signal lines are required. Moreover, the robotic system's controller would require substantial modification and/or reprogramming to facilitate processing of data received from a large number of sensors.

What is needed is an economical approach that provides conventional arm-type robotic systems with enhanced (e.g., human-like) target object tactile perception recognition and associated object manipulation control.

SUMMARY OF THE INVENTION

The present invention is directed to a robotic gripper (robot arm end effector) including an integral hierarchical sensor architecture that efficiently collects and processes large amounts of sensor data during interactions between the robotic gripper and a target object, thereby enabling a host robotic system to adjust for wide-ranging operational irregularities and to perform advance robotic operations without requiring significant changes to the robotic system's controller. The robotic gripper includes "legacy" gripper structures (e.g., a gripper mechanism including one or more finger actuators) that facilitate integration onto an existing conventional robotic system by performing basic gripper operations (e.g., grasp and manipulate a target object) in response to corresponding system gripper control signals generated by the host robotic system's controller. The hierarchical sensing control architecture includes multiple tactile sensor arrays that are respectively disposed on the gripper's finger structures, where each tactile sensor array includes multiple multimodal or mono-modal sensors disposed in a spaced-apart arrangement over an associated gripper finger's contact surface such that, during basic gripper operations, each sensor generates continuously updated single-sensor data values in response to local interactions between a target object and the corresponding localized portion of the finger's contact surface on/over which the sensor is located. The hierarchical sensing control architecture also includes a central data processing circuit that is coupled to receive sensor data from each of the multiple gripper finger structures (i.e., either raw sensor data received directly from the individual sensors or conditioned/preprocessed sensor data generated by an intervening processing circuit). By implementing tactile sensor arrays having multiple multimodal or mono-modal sensors and by configuring the central data processing circuit to generate rich sensory tactile data based on multiple single-sensor data values (i.e., by combining and summarizing data received from multiple sensors disposed on multiple gripper fingers), the hierarchical sensing control architecture facilitates the beneficial modification of robotic system operations with minimal modification to the host robotic system's controller. For example, in one embodiment the central data processing circuit is configured to generate one or more current operating condition data value(s) using combined single-sensor data values received during a given time cycle, to compare the current operating condition data value(s) with previously generated or stored operating condition data values, and to generate a corresponding rich sensory tactile data value that either confirms the current gripper/object interactive state is an expected normal operating state or to identify a problematic operating condition (e.g., a slipping event caused when a grasped target object is slipping from the gripper's grasp). That is, implementing the hierarchical sensing control architecture on the novel robotic gripper obviates the need to substantially modify a host robotic system's controller to receive and process "raw" sensor data. The present invention thereby provides an economically feasible way to provide conventional arm-type robotic systems with enhanced (e.g., human-like) target object tactile perception and associated object manipulation control.

According to an aspect of the present invention, the central data processing circuit is configured to generate the rich sensory tactile data such that it can be used to directly or indirectly modify robotic operations when the sensor data values indicate detection of certain predefined problematic operating conditions. In a first specific embodiment the rich sensory tactile data is generated as one or more feedback control signals configured to directly modify robotic operations by way of causing at least one finger actuator to perform a secondary finger operation defined at least in part by the feedback control signal. Specifically, the finger actuators disposed on the robotic gripper are configured to perform primary finger operations in response to system control signals received from the robotic system's controller, and the finger actuators are also configured to perform a secondary finger operation when a corresponding feedback control signal is asserted by the central data processing circuit. That is, the feedback control signal is de-asserted (e.g., generated as a constant low voltage or with a predetermined neutral value) by the central data processing circuit during normal operating conditions (e.g., when the sensor data does not indicate a slipping event), whereby the finger actuator performs the primary finger operation defined by a received system control signal. Conversely, when the sensor data indicates the detection of a predefined problematic operating condition (e.g., the target object is slipping from the gripper's grasp), a corresponding feedback control signal is asserted and applied to the finger actuator, whereby the finger actuator's operations replace or modify a concurrently received system control signal with the feedback control signal, thereby causing the finger actuators to perform the secondary finger operation (e.g., moving the gripper's fingers to tighten the gripper's grasping force in order to stop a detected slipping event). By configuring the robotic gripper such that gripper finger operations are directly controlled by the central data processing circuit (i.e., by way of applying feedback signal directly to the finger actuators), the present invention substantially reduces latency (i.e., increases the host robotic system's ability to quickly respond to potentially harmful or dangerous operating conditions) without requiring significant modification to the robotic system's controller. In a second specific embodiment the central data processing circuit is configured to generate tactile information that encodes the current operating condition data into a form that can both be transmitted over a serial-data signal line and easily recognized by the host robotic system's controller, whereby the controller's operating software may be easily configured to modify the system gripper control signals subsequently transmitted to the gripper when the tactile information indicates a problematic operating condition (e.g., the system gripper control signals may be modified to cause the gripper to increase the applied grasping force in response to tactile information indicating a slipping event).

According to an embodiment of the present invention, the hierarchical sensor architecture includes a sensor data processing circuits that collect multiple single-sensor data values from the groups of sensors disposed on each gripper finger, and provides the collected sensor data as a finger-level sensor data signal to the central data processing circuit. This arrangement allows the central data processing circuit to efficiently identify and compare different sensor-type data received from the various fingers in order to quickly identify potentially harmful or dangerous operating conditions. In one embodiment, each sensor data processing circuit is mounted adjacent to the group of sensors disposed on a corresponding gripper finger and coupled to each associated sensor by a separate conductive path such that it receives multiple single-sensor data values in parallel from the associated group of sensors, and is configured to transmit the corresponding finger-level sensor data signal in series to the central data processing circuit, thereby facilitating a light-weight gripper construction by minimizing the total amount of conductive path material. In a presently preferred embodiment, each sensor data processing circuit and its associated group of sensor are disposed on an associated PCB structure that is disposed adjacent to a contact portion of an associated gripper finger, where each PCB structure is fabricated using low-cost PCB manufacturing techniques and utilizes multiple layers of flexible and/or rigid PCB material and intervening conductive layers/vias to provide the parallel signal paths utilized to transmit the multiple single-sensor data values from the associated group of sensors to the sensor data processing circuit. The corresponding finger-level sensor data signal are then transmitted via serial signal wires (or other elongated conductor structures), which are respectively connected at one end to the associated sensor data processing circuit and extend along an associated gripper finger and a portion of the robotic gripper's base structure to the central processing circuit.

In alternative specific embodiments hierarchical sensor architecture utilizes various configurations and arrangements of pressure sensors, and optionally includes one or more additional sensor types that enhance the rich sensory tactile data generated by the central data processing circuit. In some embodiments, each group of sensors 120A includes a pressure sensor array including a two-dimensional array of pressure sensors and one or more additional sensor types (e.g., temperature sensors, vibration sensors and/or proximity sensors) that are operably coupled to transmit respective single-sensor sensor data values to the sensor data processing circuit. In the presently preferred embodiment, the PCB structure upon which the sensor array and the sensor data processing circuit are disposed includes at least two PCB stack-ups and the pressure sensors are piezoelectric-type sensors including piezoelectric ceramic material (e.g., lead zirconate titanate (PZT)) structures sandwiched between solder flux layers and electrodes (contact pads) formed on opposing surfaces of the two PCB stack-ups. This sandwich-type arrangement maximizes signal collection by the from an applied force due to alignment of the opposing upper/lower contact pads with the d33 (longitudinal) piezoelectric coefficient of the PZT structures, which may be further enhanced by implementing a Faraday cage that shields the PZT structures from electronic noise. In other embodiments the pressure sensors may be implemented using one or more other piezoelectric materials or sensor types, such as strain gauges, capacitive pressure sensors, cavity-based pressure sensors, piezoresistive sensors or piezoelectric sensors, and the pressure sensors forming each pressure sensor array may be arranged in a symmetric pattern or an asymmetric/random pattern. In alternative embodiments, the additional sensor(s) are either fabricated/mounted on the same PCB stack-up as the pressure sensors (i.e., such that all of the sensors are disposed in a single plane), or disposed on a different PCB stack-up from the pressure sensors (i.e., such that the additional sensors are disposed in a different plane from the plane occupied by the pressure sensors).

According to another feature of the presently preferred embodiment, the sensor data processing circuit includes at least one analog-to-digital converter (ADC) circuit that is mounted on the PCB structure and is configured to both convert analog pressure sensor signals respectively generated by each of the pressure sensors into corresponding digital pressure sensor values, and to function as a sensor data collection circuit by serially transmitting the digital pressure sensor values to a finger-level sensor data generation circuit. An optional signal conditioning circuit is connected on the signal path between each pressure sensor and the ADC circuit and configured to amplify and condition filter out noise from) the analog pressure sensor signals. In this embodiment, each pressure sensor is operably configured to generate a corresponding analog pressure sensor signals having a magnitude (amount) determined by its received contact force component (e.g., each pressure sensor generates a relatively low voltage pressure sensor data value in the absence of an applied contact force, and generates a relatively high voltage pressure sensor data value in response to a relatively high applied contact force component). Each analog pressure sensor data value is then converted by the ADC circuit into a corresponding digital pressure sensor data value that is then serially transmitted via a serial signal line to a finger-level sensor data generation circuit. By utilizing serial data transmission to pass sensor data from the ADC circuit to the finger-level sensor data generation circuit, this approach accommodates the efficient production of tactile perception apparatus having a wide range of pressure sensor configurations (e.g., high resolution sensor arrays including a relatively large number of densely packed pressure sensors, or low resolution arrays including a relatively small number of pressure sensors).

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to a tactile perception apparatus (i.e., a target object sensing architecture) that greatly enhances the capabilities of robotic systems. The following description is presented to enable one of ordinary skill in the art to make and use the invention as provided in the context of a particular application and its requirements. As used herein, directional terms such as "upper", "lower", "lowered", "front" and "back", are intended to provide relative positions for purposes of description and are not intended to designate an absolute frame of reference. With reference to electrical connections between circuit elements, the terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
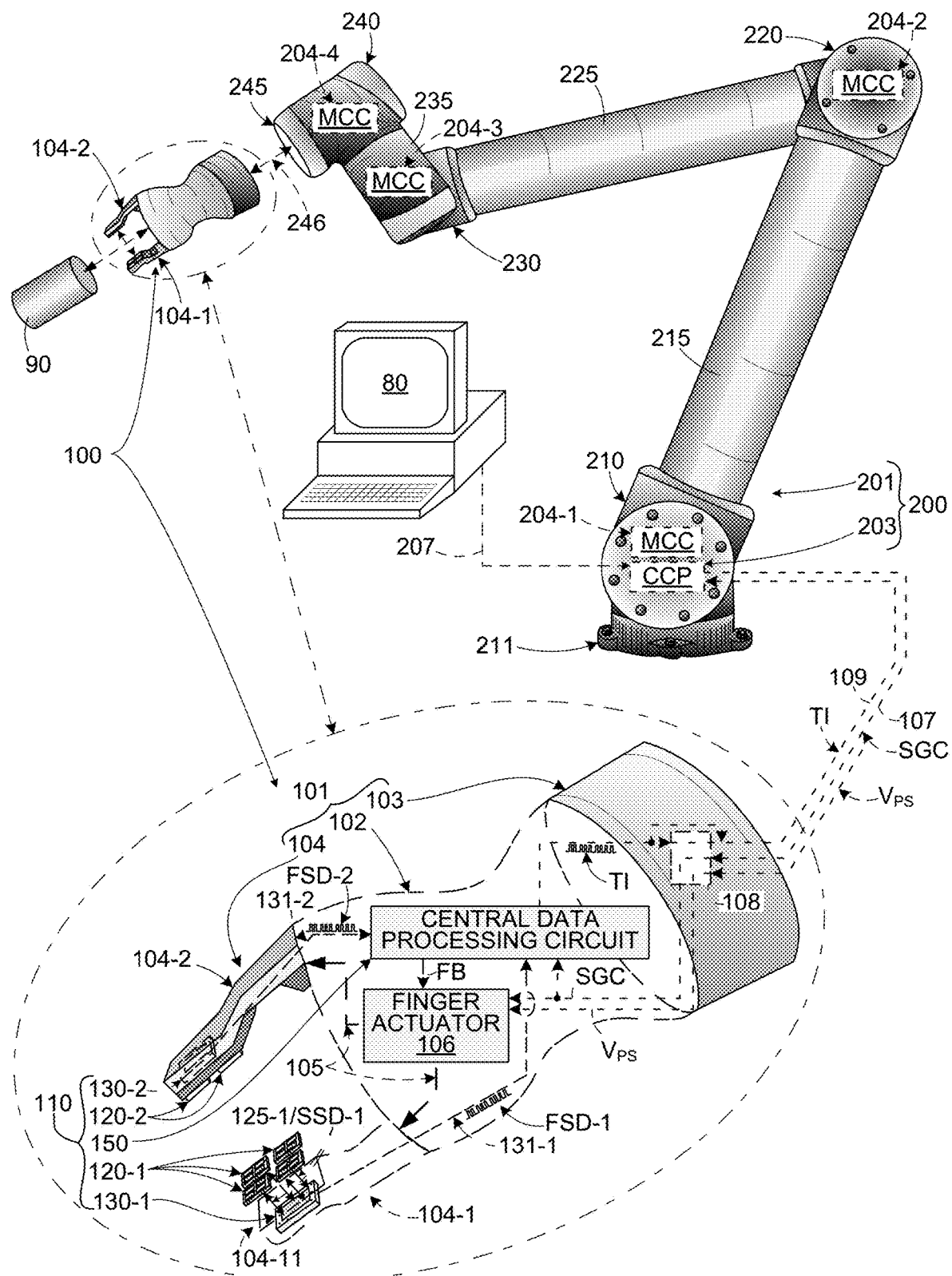
FIG. 1 is a diagram depicting an exemplary arm-type robotic system including a robotic gripper having a hierarchical sensor architecture that is configured in accordance with a generalized embodiment of the present invention.

FIG. 1 shows an exemplary arm-type robotic system 200 that is configured to implement a robotic gripper (end effector) 100 according to an exemplary embodiment of the present invention. Robot system 200 generally includes a robot arm-type mechanism 201 and a control circuit (CC) 203 (e.g., a microprocessor), where a distal end connecting structure 245 of robot arm-type mechanism 201 is configured to operably receive robotic gripper 100 using known techniques.

Robot mechanism 201 includes various legacy mechanisms and structures that are operably configured in accordance with known techniques to facilitate system operations involving the manipulation of a target object 90. In the exemplary embodiment robot mechanism 201 includes a shoulder/base mechanism 210 configured for fixed attachment to a work surface (not shown) by way of a fixed base 211, an upper arm structure 215 extending from the shoulder/base mechanism 210 to an elbow mechanism 220, a forearm structure 225 extending from the elbow mechanism 220 to a wrist mechanism 230, and a wrist structure 235 extending from the wrist mechanism 230 to hand/axial rotation mechanism 240. In the exemplary embodiment distal end connecting structure 245 is disposed adjacent to hand/axial rotation mechanism 240 and is configured to operably receive robot gripper 100. Robot mechanism 201 also includes multiple actuators, each actuator including a motor control circuit (MCC) configured to turn on/off one or more associated electric motors (not shown) in response to control signals received from control circuit 203. For example, motor control circuit (MCC) 204-1 and associated first motor(s) form a first actuator disposed in shoulder-base mechanism 210 to facilitate selective rotation and pivoting of upper arm structure 215 relative to fixed base 211, a second actuator including MMC 204-2 is disposed in elbow mechanism 220 to facilitate selective pivoting of forearm structure 225 relative to upper arm structure 215, a third actuator including MMC 204-3 is disposed in wrist mechanism 230 to facilitate selective pivoting of wrist structure 235 relative to forearm structure 225, and a fourth actuator including MMC 204-4 is disposed in hand axial rotation mechanism 240 to facilitate selective pivoting of gripper 100 relative to wrist structure 235. As mentioned above, robot mechanism 201 is merely introduced to provide a simplified context for explaining the features and benefits of the present invention, and the specific configuration of robot mechanism 201 is not intended to limit the appended claims.

Control circuit 203 causes robot mechanism 201 to perform a user-designated operation by way of transmitting system control signals to selected actuators of robot arm mechanism 201 and robotic gripper 100 in an associated control signal sequence. Each system control signal sequence generated by control circuit 203 includes one or more sets of primary control signals (e.g., primary system arm control signals and primary system gripper control signals SGC), which are generated by the control circuit's operating system software and transmitted to target actuators in accordance with a sequence established by user-provided instructions 207, which are transmitted to control circuit 203 from a programming device 80 (e.g., a personal computer or workstation) and specify associated tasks (system operations) to be performed by robot mechanism 201 and gripper 100. These primary control signals are transmitted via wires (not shown) to MMCs 204-1 to 204-4 of the various actuators disposed on robot mechanism 201 and to one or more actuators 106 disposed on robot gripper 100, thereby robot mechanism 201 and robot gripper 100 are controlled to perform the specified tasks involving operable interactions with selected target objects. For example, to perform an operable interaction involving controlling gripper 100 to grasp target object 90, the control signal generator of control circuit 203 processes corresponding user-provided instructions 207 and generates/transmits a first system gripper control signal SGC (via a signal line 107 and a socket 108) to actuator 106, thereby causing actuator 106 to increase a gap between gripper fingers 104-1 and 104-2 in accordance with an "open gripper" control instruction, then generates/transmits system control signals to MCCs 204-1 to 204-4 that cause the actuators disposed in upper arm structure 215, forearm structure 225, wrist structure 235 and axial rotation mechanism 240 to position robotic gripper 100 at designated X-Y-Z location coordinates such that gripper fingers 104-1 and 104-2 are disposed on opposite sides of target object 90, and then generates/transmits a second system gripper control signal SGC to actuator 106 that causes gripper 100 to decrease the gap between gripper fingers 104-1 and 104-2 and to apply a grasping force onto target object 90 (i.e., such that gripper fingers 104-1 and 104-2 apply opposing contact forces against opposite sides of target object 90 in response to the "close gripper" control instruction).

Referring to the bubble section located at the lower portion of FIG. 1, robotic gripper 100 generally incudes a gripper mechanism 101 and a hierarchical sensor architecture 110.

Gripper mechanism 101 includes various legacy mechanisms and structures that are operably configured in accordance with known techniques to facilitate gripper operations involving the manipulation of a target object 90. In the simplified exemplary embodiment depicted in FIG. 1, gripper mechanism 101 includes a base structure 102, a connection fixture 103 that is fixedly connected to base structure 102 and configured to operably secure the robotic gripper 100 to robot arm mechanism 201 (i.e., by way of operably attachment to distal end connecting structure 245), gripper fingers 104-1 and 104-2 movably connected to the base structure 102, and at least one finger actuator 106 at least partially disposed on base structure 102 and including a operable motor/controller/encoder configuration capable of controlling the open/close relative movement of gripper fingers 104-1 and 104-2 (e.g., by way of finger linkages 105). Those skilled in the art understand that the various structures and mechanisms of robotic gripper 100 may be implemented in many ways using techniques known in the art, and that the description of gripper mechanism 101 provided herein is greatly simplified to emphasize the novel aspects of robotic gripper 100.

Hierarchical sensor architecture 110 is disposed (i.e., integrated into or otherwise mounted on) gripper mechanism 101, and generally includes sensor groups 120-1 and 120-2, sensor data processing circuits 130-1 and 130-2, and a central data processing circuit 150.

Referring to FIG. 1, sensor groups 120-1 and 120-2 are respectively fixedly attached to opposing contact surface portions of gripper fingers 104-1 and 104-2 and positioned such that sensor groups 120-1 and 120-2 are disposed between target 90 and sensor data processing circuits 130-1 and 130-2, respectively, during operable interactions between robotic gripper 100 and target object 90. For example, as indicated in the lower bubble section of FIG. 1, sensor group 120-1 is fixedly attached to contact surface 104-11 of gripper finger 104-1 and is disposed above sensor data processing circuit 130-1. Similarly, sensor group 120-2 is disposed on a contact surface of gripper finger 104-2.

Each sensor group 120-1 and 120-2 includes multiple sensors that respectively generate sensor data values SSD-1 and SSD-2 in response to interactions between gripper fingers 104-1 and 104-2 and corresponding surface characteristics of target object 90 during each corresponding robotic system operation. For example, when robotic gripper 100 is controlled to grasp target object 90, contact portion 104-11 of gripper finger 104-1 is pressed against a corresponding first surface region of target object 90, and the contact portion of gripper finger 104-2 is pressed against an opposing second surface region of target object 90. While robotic gripper 100 maintains its grasp, each sensor of sensor group 120-1 collects associated single-sensor data value SSD-1 that reflects the interaction between a corresponding portion of contact surface 104-11 and the first surface region of target object 90, and passes the collected single-sensor data value SSD-1 to sensor data processing circuit 130-1. Similarly, each sensor of sensor group 120-2 collects sensor data value SSD-2 that reflects the interaction between the opposing contact surface of gripper finger 104-2 and the second surface region of target object 90, and passes the collected single-sensor data value SSD-2 to sensor data processing circuit 130-2. In one embodiment, each sensor of sensor groups 120-1 and 120-2 generates one associated single-sensor data value during each sensor data generation cycle (i.e., during each predetermined period of time, such as each one second time period). Accordingly, because each sensor group 120-1 and 120-2 includes multiple sensors, multiple single-sensor data values SSD-1 and SSD-2 are transmitted to sensor data processing circuits 130-1 and 130-2 during each sequential cycle.

Sensor data processing circuits 130-1 and 130-2 are disposed on gripper fingers 104-1 and 104-2, respectively, and are configured to generate corresponding finger-level sensor data signals FSD-1 and FSD-2 in response to the multiple single-sensor data values SSD-1 and SSD-2 respectively received from sensor groups 120-1 and 120-2. That is, sensor data processing circuit 130-1 is disposed on gripper finger 104-1 and is configured to generate finger-level sensor data signal FSD-1 in according with single-sensor data values SSD-1 received from sensor group 120-1. Similarly, sensor data processing circuit 130-2 is disposed on gripper finger 104-2 and is configured to generate finger-level sensor data signal FSD-2 in according with single-sensor data values SSD-2 received from sensor group 120-2. In one embodiment sensor data processing circuit 130-1 is configured to receive single-sensor data values SSD-1 in parallel from sensor group 120-1 (i.e., such that each single-sensor data values SSD-1 is received on a unique conductive signal path 125-1 extending from a corresponding sensor of sensor group 120-1 and a corresponding input terminal of sensor data processing circuit 130-1), and finger-level sensor data signal FSD-1 is generated as a serial data signal (i.e., such that all of finger-level sensor data signal FSD-1 is transmitted over a single elongated conductor (conductive path) 131-1 to central data processing circuit 150. Similarly, sensor data processing circuit 130-2 is configured to receive single-sensor data values SSD-2 in parallel from sensor group 120-2, and finger-level sensor data signal FSD-2 is transmitted over a single elongated conductor 131-2 to central data processing circuit 150. In some embodiments the generation of finger-level sensor data signals FSD-1 and FSD-2 involves converting single-sensor data values SSD-1 and SSD-2 from analog values to digital values. For example, an analog single-sensor data value SSD-1 generated by a sensor of sensor group 120-1 is converted by sensor data processing circuit 130-1 into a corresponding digital value that is then transmitted as part of finger-level sensor data signal FSD-1.

Central data processing circuit 150 is configured to generate one or more rich sensory tactile data values (e.g., tactile information TI and/or feedback control FB) in response to the sensor data originally generated by sensor groups 120-1 and 120-2. In the embodiment depicted in the lower bubble region in FIG. 1, central data processing circuit 150 is configured to generate the rich sensory tactile data values in response to finger-level sensor data signals FSD-1 and FSD-2. In other embodiments (not shown) in which sensor data processing circuits 130-1 and 130-2 may be omitted, central data processing circuit 150 may be configured to generate the rich sensory tactile data values in response to single-sensor data values SSD-1 and SSD-2. In either case, central data processing circuit 150 generates rich sensory tactile data values in response to sensor data generated by sensor groups 120-1 and 120-2 (i.e., because both single-sensor data values SSD-1 and SSD-2 and finger-level sensor data signals FSD-1 and FSD-2 represent data measured by the sensors of sensor groups 120-1 and 120-2). In one embodiment, central data processing circuit 150 is configured to process a relatively large amount of received sensor data (e.g., all finger-level sensor data signals FSD-1 and FSD-2 received during a given sensing cycle, which may include thousands of data bits) in order to identify a current operating state, and to generate corresponding rich sensor tactile data in the form of a relatively short (e.g., thirty-two-bit, sixty-four-bit or 128-bit) coded message that may then be transmitted to the robotic system's controller 203 or applied to actuator 106.

In one embodiment central data processing circuit 150 is configured to generate the rich sensor tactile data in the form of one or more feedback control signal FB, and finger actuator 106 is modified to override a current primary system gripper operation upon assertion of feedback control signal FB. For example, central data processing circuit 150 may be configured to assert feedback control signal FB when the sensor data values (e.g., finger-level sensor data signals FSD-1 and FSD-2) indicate detection of a predefined problematic operating condition (e.g., target object 90 is slipping from the grasp of robotic gripper 100), and to de-assert feedback control signal FB when the sensor data values indicate non-detection of the predefined problematic operating condition (e.g., while target object 90 remains firmly in the grasp of robotic gripper 100). In this embodiment finger actuator 106 is configured such that it performs a primary finger operation (e.g., to grasp target object 90 with a first gripping pressure) as defined by system gripper control signal SGC, which is received from robotic system control circuit 203, while feedback control signal FB is de-asserted (i.e., while central data processing circuit 150 detects that target object 90 is securely grasped between robotic fingers 104-1 and 104-2). In addition, finger actuator 106 is configured to override or ignore system gripper control signal SGC, and to perform a secondary finger operation defined by feedback control signal FB when central data processing circuit 150 detects a problematic operating condition (e.g., when slipping of target object 90 is detected, feedback control signal FB is asserted to control actuator 106 to apply a second gripping pressure to target object 90, where the second gripping pressure is greater than the first gripping pressure and thus stops the slipping event). In one embodiment central data processing circuit 150 utilizes system gripper control signal SGC, for example, to calculate the required second gripping pressure, and thereby a corresponding value for feedback control signal FB. Note that this approach facilitates rapid response to problematic operating conditions (e.g., slipping events) without requiring modification to robotic system control circuit 203, whereby robotic gripper 100 may be beneficially implemented on an otherwise conventional robotic system with minimal or no modification to the robotic systems operating software.

In another embodiment central data processing circuit 150 is configured to generate tactile information TI that encodes the current operating condition data into a condensed data format, where tactile information TI is then transmitted by a transceiver (not shown) over a serial-data signal line 109 to robotic system control circuit 203. Tactile information TI is generated using the processing and condensing approach described above with reference to the generation of feedback control signal FB, whereby tactile information TI may be presented to robotic system control circuit 203 in a format that may be relatively easily recognized and implemented into the control circuit's operating software. In this way, control circuit 203 may be configured to modify subsequently generated system gripper control signal SGC transmitted to robotic gripper 100 to address a problematic operating condition indicated by tactile information TI. In some embodiments, tactile information TI may be transmitted over a serial signal line 109 that is coupled to robotic gripper 100 by way of electrical socket 108, which is provided to facilitate the convenient transmission of system gripper control signals SGC and an actuator power supply Vps to actuator 106. In other embodiments, signal line 109 may be separate from socket 108, and central data processing circuit 150 may be configured to generate both feedback control signal FB and tactile information TI.

Figure 2:
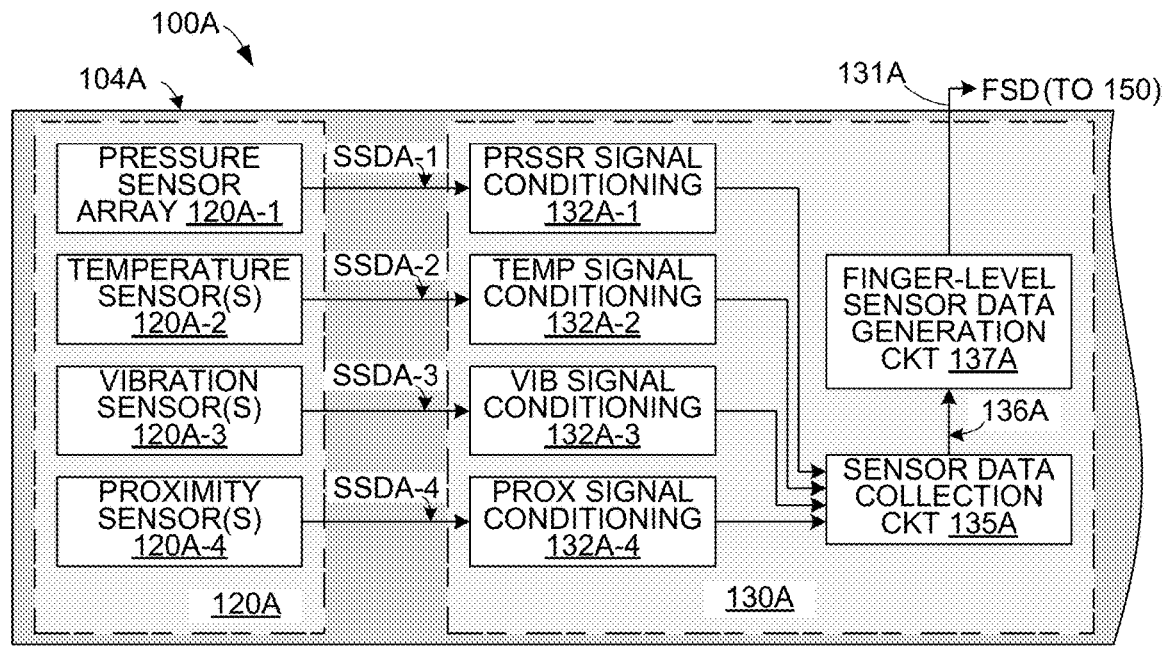
FIG. 2 is a simplified circuit diagram showing a simplified sensor group and a sensor data processing circuit, which form part of a hierarchical sensor architecture disposed on one finger of a robotic gripper according to a specific embodiment of the present invention.

FIG. 2 shows portion of a robotic gripper 100A including a sensor group 120A and a sensor data processing circuit 130A that are disposed on a corresponding robotic finger 104A and configured in accordance with a specific embodiment of the present invention. One or more other gripper fingers, a gripper mechanism and other portions of a hierarchical sensor architecture that includes sensor group 120A and a sensor data processing circuit 130A are omitted for brevity.

Referring to the left side of FIG. 2, sensor group includes a pressure sensor array 120A-1, one or more temperature sensors 120A-2, one or more vibration/texture sensors 120A-3, and one or more proximity sensors 120A-4. In one embodiment, each pressure sensor of pressure sensor array 120A-1 includes of one of a strain gauge, a capacitive pressure sensor, a cavity-based pressure sensor, a piezoelectric sensor and a piezoresistive sensor, where each sensor is configured to generate a single-sensor data value SSDA-1. Temperature sensors 120A-2 are omitted in some embodiments, and in other embodiments are implemented using resistive temperature detectors (RTD), thermoelectric sensors or other variants, and are configured to generate single-sensor data values SSDA-2. Vibration/texture sensors 120A-3 are omitted in some embodiments, and in other embodiments are implemented using either piezoelectric or piezoresistive elements or using a MEMS-based sensor configured to detect vibrations, and are configured to generate single-sensor data values SSDA-3. Proximity sensors 120A-4 are omitted in some embodiments, and in other embodiments are implemented using a capacitive-coupling-type sensing element, and are configured to generate single-sensor data values SSDA-4.

Sensor data processing circuit 130A includes signal conditioning circuits 132A-1 to 132A-4, a sensor data collection circuit 135A and a finger-level sensor data generation circuit 137A. Signal conditioning circuits 132A-1 to 132A-4 are respectively disposed to condition single-sensor data values SSDA-1 to SSDA-4, and to pass the conditions sensor data values in parallel to sensor data collection circuit 135A. Sensor data collection circuit 135A receives the parallel sensor data values and transmits them to finger-level sensor data generation circuit 137A via a serial signal line 136A. Finger-level sensor data generation circuit 137A converts sensor data values SSDA-1 to SSDA-4 into a serial format that may be transmitted on a serial signal line 131A for processing by a central data processing circuit (e.g., circuit 150 shown in FIG. 1).

Figure 3:
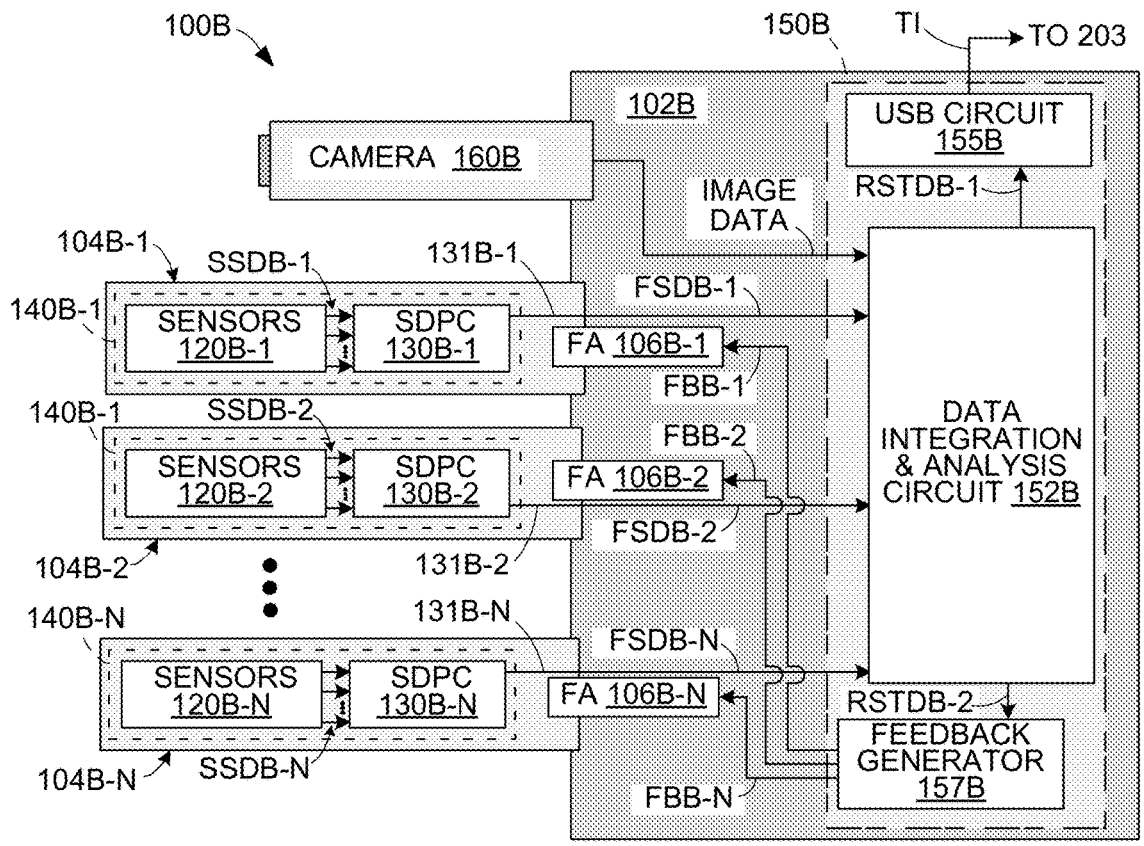
FIG. 3 is a simplified circuit diagram showing a generalized hierarchical sensor architecture utilized on an N-finger robotic gripper according to another specific embodiment of the present invention.

FIG. 3 depicts a simplified N-finger robotic gripper 100B according to another specific embodiment of the present invention. N-finger robotic gripper 100B includes three or more robotic fingers 104B-1, 104B-2 . . . 104B-N that are operably mechanically coupled to a base structure 102B by way of finger actuators (FA) 106B-1, 106B-2 . . . 106B-N, respectively, whereby the robotic fingers are controllably movable relative to base structure 102B in a manner similar to that described above with reference to FIG. 1. Referring to the left side of FIG. 3, each robotic fingers 104B-1, 104B-2 . . . 104B-N respectively includes a sensor group 120B-1, 120B-2 . . . 120B-N and a sensor data processing circuit (SDPC) 130B-1, 130B-2 . . . 130B-N that are configured as set forth above with reference to FIG. 2.

According to an aspect of robotic gripper 100B, each SDPC 130B-1 to 130B-N and its associated sensor group 120B-1 to 120B-N are mounted on a corresponding PCB structure 140B-1 to 140B-N that is disposed adjacent to a contact portion of its associated gripper finger 104B-1 to 104B-N. For example, SDPC 130B-1 and its associated sensor group 120B-1 are mounted on corresponding PCB structure 140B-1, which is mounted on robotic finger 104B-1 in the manner described above with reference to FIG. 1. Similarly, SDPC 130B-2 and its associated sensor group 120B-2 are disposed on corresponding PCB structure 140B-2 mounted near the contact surface of gripper finger 104B-2, and SDPC 130B-N and its associated sensor group 120B-N are disposed on corresponding PCB structure 140B-N and mounted near the contact surface of gripper finger 104B-N. Gripper fingers 104B-1 to 104B-N are depicted in a simplified manner in FIG. 3, and in practical embodiments gripper fingers often have two or more finger sections connected by one or more joints, where relative movement of the finger sections is controllable by finger actuators 106B-1 to 106B-N. In this case, additional sensor groups are optionally placed on each finger section (i.e., between the joints).

According to another aspect of robotic gripper 100B, central data processing circuit 150B is disposed on base structure 102B of robotic gripper 100B, and is coupled to receive finger-level sensor data signals FSDB-1 to FSDB-N from SDPC 130B-1 to 130B-N by way of elongated conductors 131B-1 to 131B-N that respectively extend partially along fingers 104B-1 to 104B-N. For example, central data processing circuit 150B is coupled to receive finger-level sensor data signals FSDB-1 from SDPC 130B-1 by way of elongated conductor 131B-1, which extends partially along gripper finger 104B-1 and a portion of base structure 102B to central data processing circuit 150B. In this embodiment central data processing circuit 150B includes a data integration and analysis circuit 152B that receives and processes finger-level sensor data signals FSDB-1 to FSDB-N, and generates both rich sensor tactile data RSTDB-1 that is transmitted as tactile information TI to a host robotic system control circuit (e.g., control circuit 203, shown in FIG. 1) by way of a transceiver circuit 155B (e.g., a USB circuit as shown, or an ethernet circuit), and rich sensor tactile data RSTDB-2 that is transmitted as feedback signals FBB-1 to FBB-N to finger actuators FA 106B-1 to 106B-N, respectively, by way of a feedback generator 157B. In some embodiments, robotic gripper 100B further includes one or more cameras (imagers) 160B, and data integration and analysis circuit 152B is further configured to receive and process image data, and to generate rich sensor tactile data RSTDB-1 and rich sensor tactile data RSTDB-2 in accordance with both the image data and finger-level sensor data signals FSDB-1 to FSDB-N.

Figure 4:
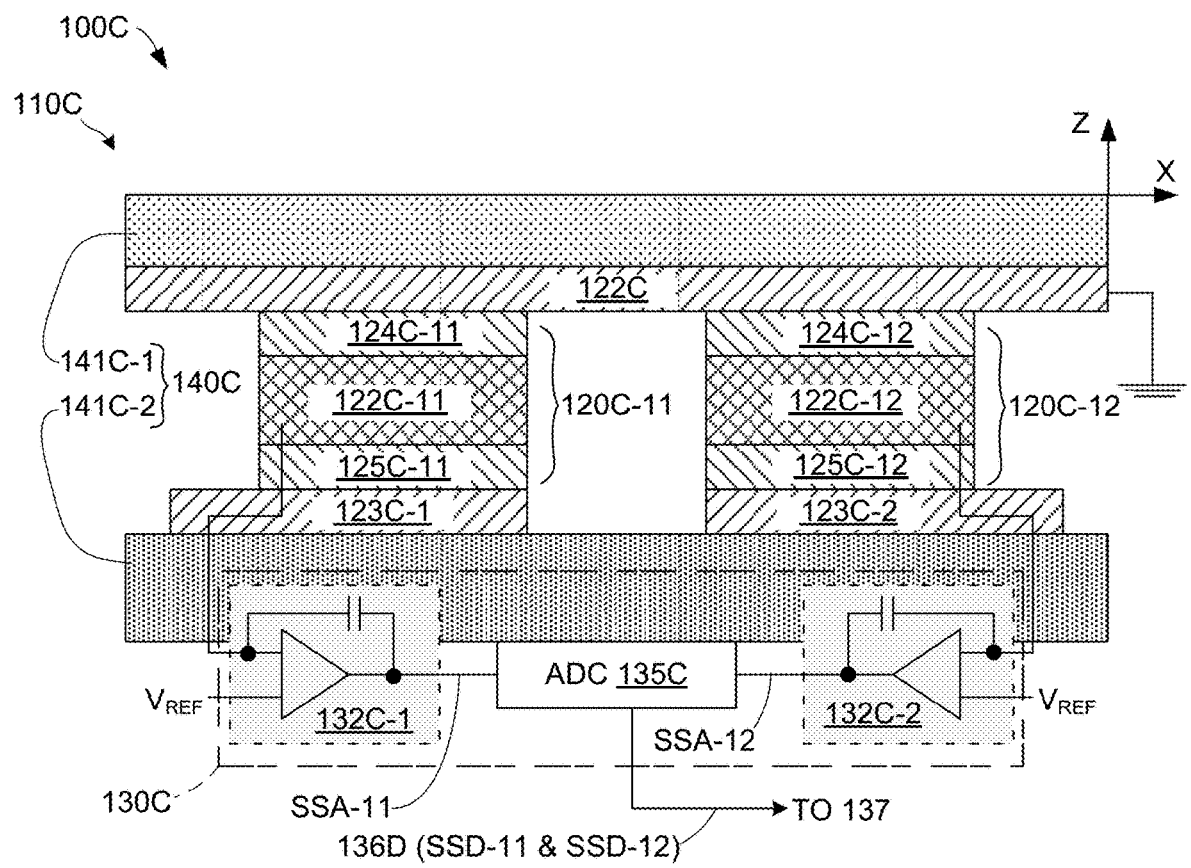
FIG. 4 is a cross-sectional side view showing a partial PCB structure including two PZT-type pressure sensors of a pressure sensor array utilized by a hierarchical sensor architecture according to another specific embodiment of the present invention.

FIG. 4 is a cross-sectional side view showing a simplified exemplary PCB structure 140C of a robotic gripper 100C including two piezoelectric-type pressure sensors 120C-11 and 120C-12 sandwiched between two PCB stack-up structures (stack-ups) 141C-1 and 141C-2. Other portions of robotic gripper 100C (e.g., two or more gripper fingers, a gripper mechanism and other portions of hierarchical sensor architecture 110C) are omitted from FIG. 4 for brevity.

Referring to FIG. 4, pressure sensors 120C-11 and 120C-12 respectively comprise piezoelectric material structures 122C-11 and 122C-12 (e.g., small blocks/dies of lead zirconate titanate (PZT)) that are respectively sandwiched between upper electrodes 124C-11 and 124C-12 and lower electrodes 125C-11 and 125C-12, which are operably coupled to upper conductive leads/circuitry 122C formed on a lower surface of PCB stack-up 141C-1 and lower leads/circuitry 123C-1 and 123C-2 formed on an upper surface of PCB stack-up 141C-2. In one embodiment PZT structures 120-11 and 120C-12 are fabricated such that their poling direction is in the vertical direction facing away from lower PCB stack-up 141C-2 at normal incidence (i.e., in the Z-axis direction). In other embodiments, the poling directions of PZT structures 120C-11 and 120C-12 may be directed along other axes. In one embodiment upper PCB stack-up 141C-1 comprises one or more layers of a flexible PCB material (e.g., polyimide polymer) to facilitate the transfer of pressure forces to pressure sensors 120C-11 and 120C-12. In the exemplary embodiment, upper circuitry 122C includes a shared conductive structure that is connected to a ground potential during operation, and each of lower circuitry 123C-1 and 123C-2 includes a separate amplification (signal conditioning) circuit 132C-1 and 132C-2 (e.g., such as the op-amp and capacitor arrangement indicated in FIG. 4) that facilitate the transfer of analog sensor data signals from sensors 120C-11 and 120C-12 to ADC circuit 135C. When robotic gripper 100C is implemented using the exemplary configuration shown in FIG. 4, pressure forces applied by a target object (not shown) onto upper PCB stack-up 141C-1 during operation are transmitted to sensors 120C-11 and 120C-12, thereby causing PZT structures 122C-11 and 122C-12 to generate associated analog pressure sensor data values SSA-1 and SSA-2 in the form of electric charges that are produced in accordance with the piezoelectric effect and have corresponding magnitudes related to corresponding amounts of Z-axis deformation (compression) of PZT structures 122C-11 and 122C-12. Analog pressure sensor data values SSA-1 and SSA-2 are then converted by ADC circuit 135C into corresponding digital pressure sensor values SSD-11 and SSD-12, and then ADC circuit 135D serially transmits digital pressure sensor values SSD-11 and SSD-12 to a finger-level sensor data generation circuit 137 (e.g., finger-level sensor data generation circuit 137A; see FIG. 2).

Figure 5:
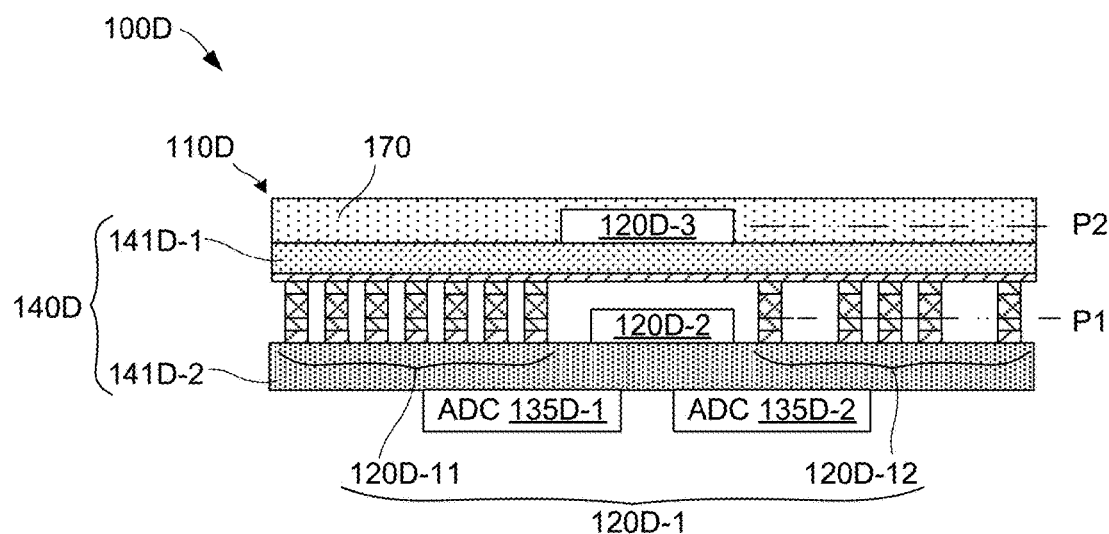
FIG. 5 is a cross-sectional side view showing a partial PCB structure including a pressure sensor array and additional sensors utilized by a hierarchical sensor architecture according to another specific embodiment.

FIG. 5 is a cross-sectional side view depicting a simplified PCB structure 140D of a hierarchical sensor architecture 110B, which forms part of a robotic gripper 100D according to another exemplary embodiment. Other portions of robotic gripper 100D (e.g., two or more gripper fingers, a gripper mechanism and other portions of hierarchical sensor architecture 110D) are omitted from FIG. 5 for brevity. Similar to the embodiment shown in FIG. 4, PCB structure 140D includes pressure sensors 120D-1 disposed between PCB stack-ups 141D-1 and 141D-2. Pressure sensors 120D-1 may be implemented using the PZT-type sensor configuration described above with reference to FIG. 4, and may be disposed on first PCB structure 141D in either a symmetric (i.e., equally-spaced) pattern arrangement (e.g., as indicated by sensors 120D-11 in FIG. 5), or an asymmetric/random pattern arrangement (e.g., as indicated by sensors 120D-12 in FIG. 5). Analog pressure sensor data values are passed from pressure sensors 120D-1 to one or both of ADC circuits 135D-1 and 135D-2 disposed on a lower surface of PCB stack-up 141D-2.

PCB structure 140D differs from above-described embodiments in that it includes one or more additional sensors 120D-2 and 120D-3 disposed on PCB structure 141D and configured to provide additional data utilized in the generation of rich sensor tactile data. Additional sensors 120D-2 and 120D-3 are implemented by sensor types that differ from the pressure sensors of pressure sensor array 120D-1 (e.g., additional sensors 120D-2 and 120D-3 may comprise either temperature sensors, vibration/texture sensors or proximity sensors).

As indicated in FIG. 5, additional sensor 120D-2 is disposed on the upper surface of PCB stack-up 141D-2 (i.e., in the same physical layer/plane, indicated by dash-dot-line P1, that includes pressure sensor array 120D-1), and additional sensor 120D-3 is disposed on upper surface of PCB stack-up 141D-1 (i.e., in a different physical layer/plane, indicated by dash-dot-line P2, from that occupied by pressure sensor array 120D-1). In some embodiments, additional sensor 120D-2 includes circuitry that is self-contained within layer P1, and additional sensor 120D-3 includes circuitry that is self-contained within layer P2. In some embodiments, additional sensors 120D-2 and 120D-3 are operably coupled to ADC circuit 135D-2. In some embodiments a skin-like encapsulating layer 170 consisting essentially of a durable flexible material (e.g., silicone rubber) is disposed on an uppermost surface of PCB stack-up 141D-1.

Although the present invention has been described with respect to certain specific embodiments, it will be clear to those skilled in the art that the inventive features of the present invention are applicable to other embodiments as well, all of which are intended to fall within the scope of the present invention. For example, although robotic gripper 100 is described as being configured for attachment to distal end connecting structure 245 (see FIG. 1), in other embodiments a robotic gripper may include one or more additional structures that are described as being part of robot arm mechanism 201 (e.g., hand axial rotation mechanism 240 and wrist structure 235) without departing from the spirit and scope of the present invention. Moreover, the hierarchical sensor architecture configurations described herein may be modified to include one or more features associated with the flex-rigid sensor array structures described in co-owned and co-filed U.S. patent application Ser. No. 16/832,755 entitled "FLEX-RIGID SENSOR ARRAY STRUCTURE FOR ROBOTIC SYSTEMS", or in co-owned and co-filed U.S. patent application Ser. No. 16/832,690 entitled "TACTILE PERCEPTION APPARATUS FOR ROBOTIC SYSTEMS", both of which being incorporated herein by reference in its entirety.

The invention claimed is:

1. A robotic gripper for a robotic system, the robotic system including a robot arm mechanism and a control circuit, the system control circuit being configured to generate system control signals that control mechanical operations of the robot arm mechanism and said robotic gripper such that the robotic gripper interacts with a target object during a corresponding operation, wherein the robotic gripper includes:
- a gripper mechanism including a base structure, a connection fixture connected to the base structure and configured to operably secure the robotic gripper to the robot arm mechanism, a plurality of gripper fingers movably connected to the base structure, and at least one finger actuator disposed on the base structure and configured to control movement of the plurality of gripper fingers; and
- a hierarchical sensor architecture disposed on the gripper mechanism, the hierarchical sensor architecture comprising:
  - a plurality of sensor groups, each said group of sensors being disposed on a corresponding gripper finger of said plurality of gripper fingers and including a plurality of sensors configured to generate sensor data in response to interactions between said corresponding gripper finger and the target object during said each corresponding operations; and
  - a central data processing circuit configured to generate one or more rich sensory tactile data values in response to said sensor data values.

2. The robotic gripper of claim 1,
wherein the central data processing circuit is configured to generate a feedback control signal when said sensor data values indicate detection of a predefined problematic operating condition during said interactions between said robotic gripper and said target object;
wherein the finger actuator is configured to perform primary finger operations defined by the system control signals while said feedback signal is de-asserted by said central data processing circuit, and said finger actuator is configured to perform a secondary finger operation defined at least in part by the feedback signal when said central data processing circuit asserts said feedback signal.

3. The robotic gripper of claim 1,
wherein the central data processing circuit is configured to generate tactile information in response to said sensor data values, and
wherein the hierarchical sensor architecture further comprises a transceiver circuit configured to transmit the tactile information to the control circuit of the robotic system.

4. The robotic gripper of claim 1,
wherein the hierarchical sensor architecture further comprises a plurality of sensor data processing circuits, each said sensor data processing circuit being disposed on a corresponding said gripper finger and configured to generate a corresponding finger-level sensor data signal in response to a plurality of single-sensor data signals received from an associated said group of sensors disposed on said corresponding said gripper finger, and
wherein the central data processing circuit is operably coupled to receive the finger-level sensor data signals from said plurality of sensor data processing circuits.

5. The robotic gripper of claim 4, wherein each said sensor data processing circuit includes a collection circuit configured to receive in parallel the sensor data generated by an associated said group of sensors, and configured to serially transmit the sensor data to a finger-level sensor data generation circuit.

6. The robotic gripper of claim 5, wherein each said sensor data processing circuit and said associated group of sensors are mounted on a printed circuit board (PCB) structure that is disposed adjacent to a contact portion of said associated gripper finger, each said PCB structure being configured such that said associated group of said sensors is positioned between said target object and said sensor data processing circuit during said corresponding operation.

7. The robotic gripper of claim 6,
wherein said central data processing circuit is disposed on the base structure and,
wherein said hierarchical sensor architecture further comprises a plurality of elongated conductors disposed on the robotic gripper such that a portion of each said elongated conductor extends along an associated said gripper finger and is configured to transmit said finger-level sensor data signals generated by an associated said sensor data processing circuit to the central processing circuit.

8. The robotic gripper of claim 1, wherein each group of sensors disposed on said each corresponding gripper finger comprises an array of pressure sensors, and zero or more of at least one temperature sensor, at least one vibration sensor, and at least one proximity sensor.

9. The robotic gripper of claim 8,
wherein each pressure sensor of said array of pressure sensors comprises of one of a strain gauge, a capacitive pressure sensor, a cavity-based pressure sensor, a piezoelectric sensor and a piezoresistive sensor, and
wherein said plurality of pressure sensors are disposed in one of a symmetric arrangement, an asymmetric arrangement and a random pattern arrangement on said first PCB structure.

10. The robotic gripper of claim 9,
wherein the hierarchical sensor architecture further comprises a printed circuit board (PCB) structure including a first PCB stack-up and a second PCB stack-up, and
wherein each of said plurality of pressure sensors comprises a piezoelectric material structure sandwiched between said first and second PCB stack-ups.

11. The robotic gripper of claim 9, further comprising at least one additional sensor mounted on the PCB structure, wherein said additional sensor comprises at least one of a vibration sensor, a proximity sensor and a temperature sensor.

12. The robotic gripper of claim 9, wherein each said sensor data processing circuit comprises an analog-to-digital converter (ADC) circuit that is mounted on the PCB structure and is configured to both convert analog pressure sensor signals respectively generated by said plurality of pressure sensors into corresponding digital pressure sensor values, and to serially transmit the digital pressure sensor values to a finger-level sensor data generation circuit.

13. A robotic gripper for a robotic system, the robotic system including a robot arm mechanism and a control circuit, the system control circuit being configured to generate system control signals that control mechanical operations of the robot arm mechanism and gripper control signals that control mechanical operations of the robotic gripper such that the robotic gripper interacts with a target object during a corresponding operation in accordance with the system control and gripper control signals, wherein the robotic gripper includes:
- a gripper mechanism including a base structure, a connection fixture connected to the base structure and configured to operably secure the robotic gripper to the robot arm mechanism, a plurality of gripper fingers movably connected to the base structure, and at least one finger actuator disposed on the base structure and configured to control movement of the plurality of gripper fingers in response to said gripper control signals;

a plurality of sensor groups, each said group of sensors being disposed on a corresponding gripper finger of said plurality of gripper fingers and including a plurality of sensors respectively configured to generate sensor data values in response to interactions between said corresponding gripper finger and the target object during said each corresponding operations;

a plurality of sensor data processing circuits, each said sensor data processing circuit being disposed on a corresponding said gripper finger and configured to generate a corresponding finger-level sensor data signal in response to a plurality of single-sensor data values received from an associated said group of sensors disposed on said corresponding said gripper finger; and a central data processing circuit is operably coupled to receive the finger-level sensor data signals from said plurality of sensor data processing circuits, and configured to generate a feedback control signal when said finger-level sensor data signals indicate detection of a predefined condition during said interactions between said robotic gripper and said target object, wherein the finger actuator is configured to perform primary finger operations defined by the system control signals while said feedback signal is de-asserted by said central data processing circuit, and said finger actuator is configured to perform a secondary finger operation defined by said feedback signal when said central data processing circuit asserts said feedback signal.

14. The robotic gripper of claim 13, wherein each said sensor data processing circuit includes a collection circuit configured to receive in parallel the sensor data generated by an associated said group of sensors, and configured to serially transmit the sensor data to a finger-level sensor data generation circuit.

15. The robotic gripper of claim 14, wherein each said sensor data processing circuit and said associated group of sensors are mounted on a printed circuit board (PCB) structure that is disposed adjacent to a contact portion of said associated gripper finger, each said PCB structure being configured such that said associated group of said sensors is positioned between said target object and said sensor data processing circuit during said corresponding operation.

16. The robotic gripper of claim 15,
wherein said central data processing circuit is disposed on the base structure and,
wherein said robotic gripper further comprises a plurality of elongated conductors disposed such that a portion of each said elongated conductor extends along an associated said gripper finger and is configured to transmit said finger-level sensor data signals generated by an associated said sensor data processing circuit to the central processing circuit.

17. The robotic gripper of claim 13, wherein each group of sensors disposed on said each corresponding gripper finger comprises an array of pressure sensors, and zero or more of at least one temperature sensor, at least one vibration sensor, and at least one proximity sensor.

18. The robotic gripper of claim 17 further comprising a printed circuit board (PCB) structure including a first PCB stack-up and a second PCB stack-up, wherein each of said plurality of pressure sensors comprises a piezoelectric material structure sandwiched between said first and second PCB stack-ups.

19. The robotic gripper of claim 17, wherein each said sensor data processing circuit comprises an analog-to-digital converter (ADC) circuit that is mounted on the PCB structure and is configured to both convert analog pressure sensor signals respectively generated by said plurality of pressure sensors into corresponding digital pressure sensor values, and to serially transmit the digital pressure sensor values to a finger-level sensor data generation circuit.

20. A robotic gripper for a robotic system, the robotic system including a robot arm mechanism and a control circuit, the system control circuit being configured to generate system control signals that control mechanical operations of the robot arm mechanism and gripper control signals that control mechanical operations of the robotic gripper such that the robotic gripper interacts with a target object during a corresponding operation in accordance with the system control and gripper control signals, wherein the robotic gripper includes:

a gripper mechanism including a base structure, a connection fixture connected to the base structure and configured to operably secure the robotic gripper to the robot arm mechanism, a plurality of gripper fingers movably connected to the base structure, and at least one finger actuator disposed on the base structure and configured to control movement of the plurality of gripper fingers in response to said gripper control signals; and a hierarchical sensor architecture disposed on the gripper mechanism, the hierarchical sensor architecture comprising:

a plurality of sensor groups, each said group of sensors being disposed on a corresponding gripper finger of said plurality of gripper fingers and including a plurality of sensors configured to generate sensor data in response to interactions between said corresponding gripper finger and the target object during said each corresponding operations;

a plurality of sensor data processing circuits, each said sensor data processing circuit being disposed on a corresponding said gripper finger and configured to generate a corresponding finger-level sensor data signal in response to a plurality of single-sensor data signals received from an associated said group of sensors disposed on said corresponding said gripper finger;

a central data processing circuit operably coupled to receive the finger-level sensor data signals from said plurality of sensor data processing circuits and to generate tactile information in response to a current interactive condition indicated by said finger-level sensor data signals; and a transceiver circuit configured to transmit the tactile information to the control circuit of the robotic system.

* * * * *